(12) United States Patent
Takahashi et al.

(10) Patent No.: US 10,924,849 B2
(45) Date of Patent: Feb. 16, 2021

(54) SOUND SOURCE SEPARATION DEVICE AND METHOD

(71) Applicant: SONY CORPORATION, Tokyo (JP)

(72) Inventors: Naoya Takahashi, Kanagawa (JP); Yuhki Mitsufuji, Tokyo (JP); Stefan Uhlich, Horb am Neckar (DE); Michael Enenkl, Stuttgart (DE); Thomas Kemp, Esslingen (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/325,219

(22) PCT Filed: Aug. 25, 2017

(86) PCT No.: PCT/JP2017/030631
§ 371 (c)(1),
(2) Date: Feb. 13, 2019

(87) PCT Pub. No.: WO2018/047643
PCT Pub. Date: Mar. 15, 2018

(65) Prior Publication Data
US 2019/0208320 A1    Jul. 4, 2019

(30) Foreign Application Priority Data

Sep. 9, 2016   (JP) ................................. 2016-176215
Apr. 14, 2017  (JP) ................................. 2017-080700

(51) Int. Cl.
*H04R 3/00*   (2006.01)
*G06N 3/04*   (2006.01)
(Continued)

(52) U.S. Cl.
CPC ........... *H04R 3/005* (2013.01); *G06N 3/0454* (2013.01); *G06N 3/0481* (2013.01); *G10L 21/0272* (2013.01); *H04R 5/04* (2013.01)

(58) Field of Classification Search
CPC ........ H04R 3/005; H04R 5/04; G06N 3/0454; G06N 3/0481; G10L 21/0272
(Continued)

(56) References Cited

U.S. PATENT DOCUMENTS

| 2007/0025556 A1* | 2/2007 | Hiekata ............... G10L 21/0272 381/17 |
| 2014/0067385 A1 | 3/2014 | Oliveira et al. |
| 2015/0205575 A1 | 7/2015 | Kitazawa |

FOREIGN PATENT DOCUMENTS

| EP | 1748427 A1 | 1/2007 |
| JP | 2007-033825 A | 2/2007 |

(Continued)

OTHER PUBLICATIONS

International Search Report and Written Opinion of PCT Application No. PCT/JP2017/030631, dated Oct. 17, 2017, 09 pages of ISRWO.

(Continued)

*Primary Examiner* — Vivian C Chin
*Assistant Examiner* — Douglas J Suthers
(74) *Attorney, Agent, or Firm* — Chip Law Group

(57) ABSTRACT

Provided is a sound source separation device that includes a combining unit that combines a first sound source separation signal of a predetermined sound source, the first sound source separation signal being separated from a mixed sound signal by a first sound source separation system, with a second sound source separation signal of the sound source, the second sound source separation signal being separated from the mixed sound signal by a second sound source separation system that differs in separation performance from the first sound source separation system in predetermined units of time, and that outputs a sound source separation signal obtained by the combination.

8 Claims, 11 Drawing Sheets

(51) Int. Cl.
*H04R 5/04* (2006.01)
*G10L 21/0272* (2013.01)

(58) Field of Classification Search
USPC .......................................................... 381/26
See application file for complete search history.

(56) References Cited

FOREIGN PATENT DOCUMENTS

| | | |
|---|---|---|
| JP | 2008-278406 A | 11/2008 |
| JP | 2012-178679 A | 9/2012 |
| JP | 2014-052630 A | 3/2014 |
| JP | 2015-138053 A | 7/2015 |

OTHER PUBLICATIONS

Nugraha, et al., "Multichannel Music Separation with Deep Neural Networks", 24th European Signal Processing Conference (EUSIPCO), 2016 IEEE, pp. 1748-1752.

Nugraha, et al., "Multichannel Music Separation with Deep Neural Networks", 24th European Signal Processing Conference (EUSIPCO), 1748-1752 pages.

* cited by examiner

SOUND SOURCE SEPARATION DEVICE AND METHOD

CROSS REFERENCE TO RELATED APPLICATIONS

This application is a U.S. National Phase of International Patent Application No. PCT/JP2017/030631 filed on Aug. 25, 2017, which claims priority benefit of Japanese Patent Application No. JP 2016-176215 filed in the Japan Patent Office on Sep. 9, 2016 and also claims priority benefit of Japanese Patent Application No. JP 2017-080700 filed in the Japan Patent Office on Apr. 14, 2017. Each of the above-referenced applications is hereby incorporated herein by reference in its entirety.

TECHNICAL FIELD

The present technology relates to a sound source separation device, and a method and a program, and in particular, a sound source separation device that enables to achieve higher separation performance, and a method and a program.

BACKGROUND ART

There is conventionally known a sound source separation technology in which a signal of a sound of a target sound source is extracted from a mixed sound signal that includes sounds from a plurality of sound sources.

As such a sound source separation technology, for example, a Multi Channel Wiener Filter (MWF)-based sound source separation technique that uses Deep Neural Network (DNN) is proposed (refer to, for example, non-patent document 1).

In this sound source separation technique, a mixed sound signal is subjected to amplitude spectrum estimation by DNN to determine an estimated value of the amplitude spectrum of each sound source, and a source signal of a target sound source is determined from those estimated values and the mixed sound signal by a least mean square error method.

CITATION LIST

Non-Patent Document

Non-patent Document 1: A. A. Nugraha, A. Liutkus, and E. Vincent. "Multichannel music separation with deep neural networks." European Signal Processing Conference (EUSIPCO). 2016.

SUMMARY OF THE INVENTION

Problems to be Solved by the Invention

However, in the above-described technology, it was difficult to separate the source signal of the target sound source from the mixed sound signal with sufficiently high separation performance.

For example, with respect to the MWF-based sound source separation technique that uses DNN, with the decrease in error of the output of DNN, the sound source separation performance increases. However, since learning data is limited, and since the problem is complicated, learning of DNN is generally difficult, and therefore an amplitude spectrum obtained as the output of DNN includes an error. This is one of the causes of deterioration of the separation performance.

The present technology has been devised in consideration of such a situation, and enables to achieve higher separation performance.

Solutions to Problems

A sound source separation device according to one aspect of the present technology includes a combining unit that combines a first sound source separation signal of a predetermined sound source, the first sound source separation signal being separated from a mixed sound signal by a first sound source separation system, with a second sound source separation signal of the sound source, the second sound source separation signal being separated from the mixed sound signal by a second sound source separation system that differs in separation performance from the first sound source separation system in predetermined units of time, and that outputs a sound source separation signal obtained by the combination.

The combining unit can be configured to linearly combine the first sound source separation signal with the second sound source separation signal on the basis of a combination parameter.

The sound source separation device can further include a combination parameter determination unit that determines the combination parameter on the basis of a probability of being a signal of the sound source obtained with respect to the first sound source separation signal, and a probability of being a signal of the sound source obtained with respect to the second sound source separation signal.

The separation performance can be SIR, SAR, SDR or ISR.

A magnitude relation between the separation performance of the first sound source separation system and the separation performance of the second sound source separation system can be configured to change with time.

The first sound source separation system can be the same as the second sound source separation system.

The first sound source separation system can be any of FNN, RNN and NMF, and the second sound source separation system can be any of FNN, RNN and NMF.

A sound source separation method or program according to one aspect of the present technology includes the step of combining a first sound source separation signal of a predetermined sound source, the first sound source separation signal being separated from a mixed sound signal by a first sound source separation system, with a second sound source separation signal of the sound source, the second sound source separation signal being separated from the mixed sound signal by a second sound source separation system that differs in separation performance from the first sound source separation system in predetermined units of time, and outputting a sound source separation signal obtained by the combination.

According to one aspect of the present technology, a first sound source separation signal of a predetermined sound source, the first sound source separation signal being separated from a mixed sound signal by a first sound source separation system, is combined with a second sound source separation signal of the sound source, the second sound source separation signal being separated from the mixed sound signal by a second sound source separation system that differs in separation performance from the first sound source separation system in predetermined units of time, and a sound source separation signal obtained by the combination is output.

Effects of the Invention

According to one aspect of the present technology, higher separation performance can be achieved.

It should be noted that the effects described herein are not necessarily limited, and may be any one of the effects described in the present disclosure.

MODE FOR CARRYING OUT THE INVENTION

Embodiments to which the present technology is applied will be described below with reference to the accompanying drawings.

First Embodiment

<About the Present Technology>

Figure 1:
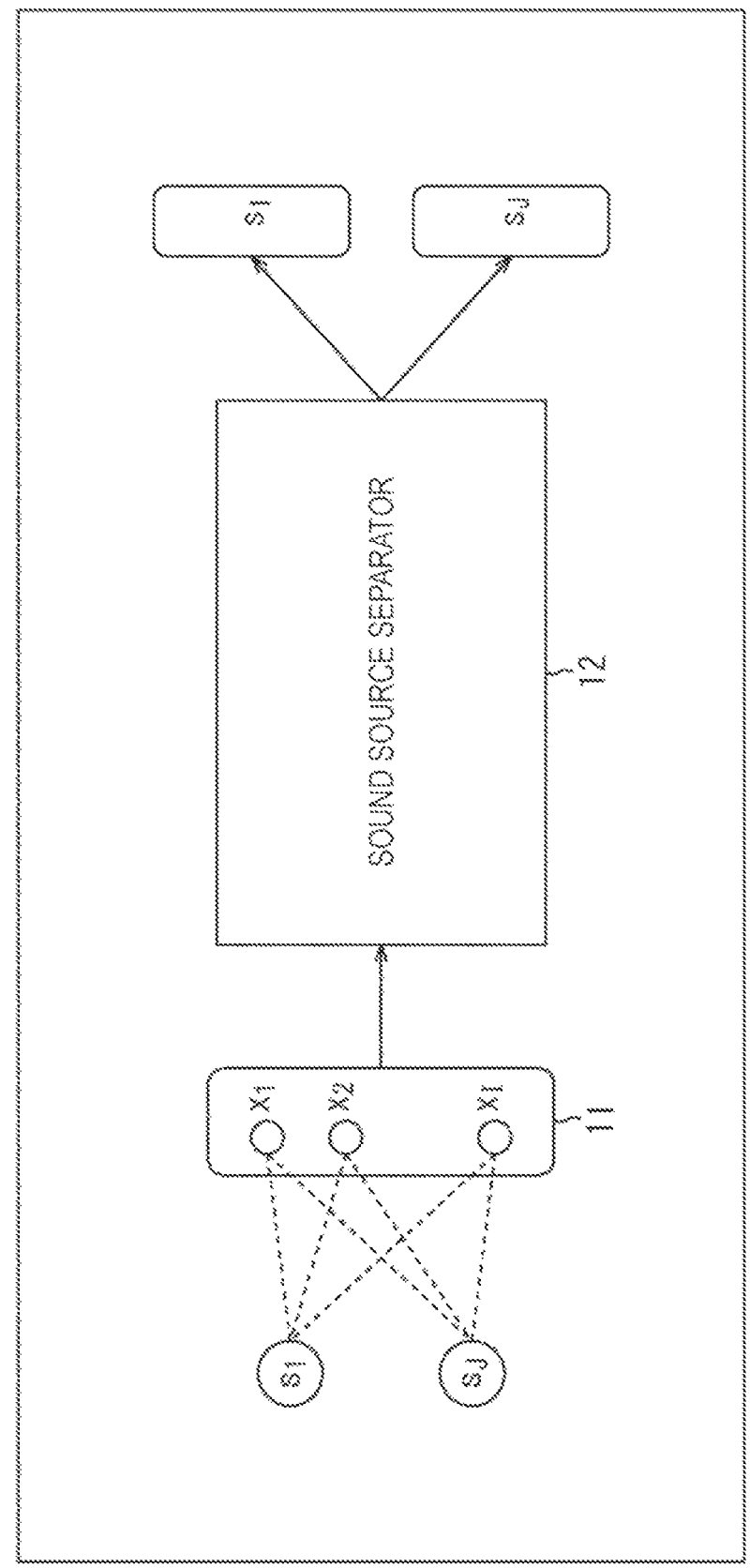
FIG. 1 is a diagram illustrating sound source separation.

For example, with respect to the sound source separation, in general, each sound source is separated as shown in FIG. 1.

In this example, J pieces of sound sources $s_1$ to $s_J$ exist in a sound acquisition space. When a sound from each of the J pieces of sound sources is acquired by a microphone array 11 that includes I pieces of microphones, an I channel (I dimension) mixed sound signal x is obtained, the mixed sound signal x including sound acquisition signals $x_1$ to $x_I$ for each of the I pieces of microphones, in other words, for each of I pieces of channels.

When the I channel mixed sound signal x obtained in this manner is input into a sound source separator 12, the sound source separator 12 subjects the input mixed sound signal x to sound source separation.

Subsequently, as the result of estimating the signal of the sound of each of the sound sources $s_1$ to $s_J$, source signals $\hat{s}_1$ to $\hat{s}_J$ are obtained. For example, the source signal $\hat{s}_1$ is an I channel signal (I dimension vector) that includes signals of sounds of the sound source $s_1$ obtained for each of I pieces of channels.

As a technique for sound source separation performed in the sound source separator 12, for example, a MWF-based sound source separation technique that uses DNN is known.

Here, the MWF-based sound source separation technique that uses DNN will be described. It should be noted that hereinafter each signal is represented by Short Term Fourier Transform (SIFT) domain.

For example, it is assumed that the I channel mixed sound signal is represented as x(k,m), where k is a frequency bin, and m is a time frame, and a source signal that is a signal of a sound of the j-th sound source $s_j$ (where $1 \leq j \leq J$) among J pieces of sound sources is represented as $s_j(k,m)$. The mixed sound signal x(k,m) and the source signal $s_j(k,m)$ each include a complex spectrum for each of I pieces of channels.

In such a case, in MWF, a signal model is assumed as the following equation (1).

[Equation 1]

$$x(k,m)=s_j(k,m)+z(k,m)=s_j(k,m)+\Sigma_{j'=1,j'\neq j}^{J} s_{j'}(k,m) s_j$$
$$(k,m) \sim N_C(0, v_j(k,m) R_j(k,m)) \text{ for } j=1,\ldots J$$
$$\text{where, } x(k,m) \in \mathbb{C}^I, s_j(k,m) \in \mathbb{C}^I, v_j(k,m) \in \mathbb{R} \quad (1)$$

It should be noted that in the equation (1), z(k,m) indicates complex Gaussian noise, $v_j(k,m)$ indicates power spectrum density, and $R_j(k,m)$ indicates a spatial correlation matrix. In addition, $N_C(0, v_j(k,m) R_j(k,m))$ indicates the Gaussian probability density distribution of complex number.

In the equation (1), the sum of source signals $s_{j'}(k,m)$ of sound sources other than the target j-th sound source $s_j$ is complex Gaussian noise z(k,m). From such equation (1), it is revealed that the mixed sound signal x(k,m) is represented as the sum of the source signal $s_j(k,m)$ of the target sound source $s_j$ and the complex Gaussian noise z(k,m).

Moreover, assuming that the source signals $s_j(k,m)$ are independent of one another, the source signal $s_j(k,m)$ of the target sound source $s_j$ can be estimated from the mixed sound signal x(k,m) by the least mean square error method. Here, the estimated value $\hat{s}_{j,MWF}(k,m)$ of the least mean square error, in other words, the estimated value of the source signal $s_j(k,m)$ by the least mean square error method can be determined by the calculation represented by the following equation (2). It should be noted that $\hat{s}_{j,MWF}(k,m)$ is a signal that includes a complex spectrum for each of I pieces of channels.

[Equation 2]

$$\hat{s}_{j,MWF}(k,m) = v_j(k,m) R_j(k,m) (\Sigma_{j'=1}^{J} v_{j'}(k,m) R_{j'}(k,m))^{-1} \times$$
$$(k,m) \text{ where, } \hat{s}_{j,MWF}(k,m) \in \mathbb{C}^I \quad (2)$$

MWF is calculated by this equation (2). However, in order to determine the source signal $\hat{s}_{j,MWF}(k,m)$, which is an estimated value of the actual source signal $s_j(k,m)$, by the equation (2), it is necessary to determine the power spectrum density $v_j(k,m)$ and the spatial correlation matrix $R_j(k,m)$ for each of J pieces of sound sources.

With respect to the MWF-based sound source separation technique that uses DNN, assuming that the spatial correlation matrix $R_j(k,m)$ is time-invariant, in other words, assuming that a position of each sound source does not change with time, the power spectrum density $v_j(k,m)$ and the spatial correlation matrix $R_j(k,m)$ are determined by DNN.

More specifically, on the assumption that the output of DNN is $\{\hat{s}_1(k,m), \ldots, \hat{s}_J(k,m)\}$, the power spectrum density $v_j(k,m)$ and the spatial correlation matrix $R_j(k,m)$ are determined by the following equations (3) and (4) respectively.

[Equation 3]

$$\hat{v}_j(k, m) = \frac{1}{I}\|\hat{s}_j(k, m)\|^2 \quad (3)$$

[Equation 4]

$$\hat{R}_j(k) = \frac{\sum_{m=1}^{M} \hat{s}_j(k, m)\hat{s}_j(k, m)^H}{\sum_{m=1}^{M} \hat{v}_j(k, m)} \quad (4)$$

It should be noted that in the equation (3), $\hat{v}_j(k,m)$ indicates an estimated value of the power spectrum density $v_j(k,m)$, and in the equation (4), $\hat{R}_j(k)$ indicates an estimated value of the spatial correlation matrix $R_j(k,m)$. In particular, here, it is assumed that the spatial correlation matrix $R_j(k,m)$ is constant irrespective of the frame m. Therefore, the spatial correlation matrix obtained by estimation is represented as $\hat{R}_j(k)$ with the index m omitted.

In addition, in the equations (3) and (4), $\hat{s}_j(k,m)$, which is the output of DNN, is a signal that includes an amplitude spectrum for each of I pieces of channels, and is an estimated value of the amplitude spectrum of the sound from the sound source $s_j$.

In the MWF-based sound source separation technique that uses DNN, the source signal $\hat{s}_{j,MWF}(k,m)$ of the target sound source is determined as described above.

In this case, the closer the amplitude spectrum $\hat{s}_j(k,m)$ that is the output of DNN gets to the original source signal $s_j(k,m)$, the estimated error becomes smaller. However, since learning data is limited, and since the problem is complicated, learning of DNN is generally difficult, and therefore an amplitude spectrum obtained as the output of DNN includes an error. This is one of the causes of deterioration of the separation performance of the sound source separation.

In the MWF-based sound source separation technique described above, DNN can be replaced with Long Short Term Memory (LSTM). An estimation result that differs in characteristics from those of DNN can be obtained as the result of estimating the amplitude spectrum. However, learning of LSTM is still difficult, and since the amplitude spectrum obtained as the estimation result includes an error, it is difficult to achieve sufficiently high separation performance.

Accordingly, by combining sound source separators, each of which has the same level of separation performance but has output that differs in time characteristics, in other words, by combining sound source separation systems, the present technology enables to achieve separation performance that is higher than the separation performance of each of the sound source separators.

Here, differing in time characteristics of output means that the estimation result of the signal of the sound source by the sound source separation system, more specifically, for example, the separation performance such as a level (intensity) of interference, a level of artifact, and a level of noises differs depending on the time.

In particular, a plurality of sound source separation systems that are combined in the present technology are, for example, as follows.

In other words, in the individual sound source separation system, the separation performance of the sound source differs in predetermined units of time such as frame unit, in other words, the separation performance such as a level (intensity) of interference, a level of artifact, and a level of noises changes in predetermined units of time. Incidentally, more specifically, as the separation performance of a sound source, for example, Source to Interference Ratio (SIR), Sources to Artifacts Ratio (SAR), Signal to Distortion Ratio (SDR), source Image to Spatial distortion Ratio (ISR) or the like can be used.

The plurality of sound source separation systems that are combined are considered to be systems that differ in sound source separation performance from one another in predetermined units of time such as frame unit. In other words, the separation performance differs between a certain sound source separation system and another sound source separation system, and what is more, the relationship between the separation performances of those sound source separation systems changes (differs) in predetermined units of time.

In further detail, for example, the plurality of sound source separation systems that are combined are sound source separation systems in which a magnitude relation of the separation performance changes with time when being examined in predetermined units of time.

More specifically, it is assumed that, for example, a first sound source separation system and a second sound source separation system are combined. In this case, when an arbitrary mixed sound signal is subjected to sound source separation in each of the first sound source separation system and the second sound source separation system, the separation performance changes in predetermined units of time. In addition, a specific sound source separation system having higher separation performance differs depending on the time (the time of day). For example, although the separation performance of the first sound source separation system is higher than that of the second sound source separation system at certain time, the separation performance of the second sound source separation system is higher than that of the first sound source separation system at another time. In other words, the magnitude relation of the separation performance between the first sound source separation system and the second sound source separation system differs depending on a frame or the like.

Configuration Example of Sound Source Separation Device

Figure 2:
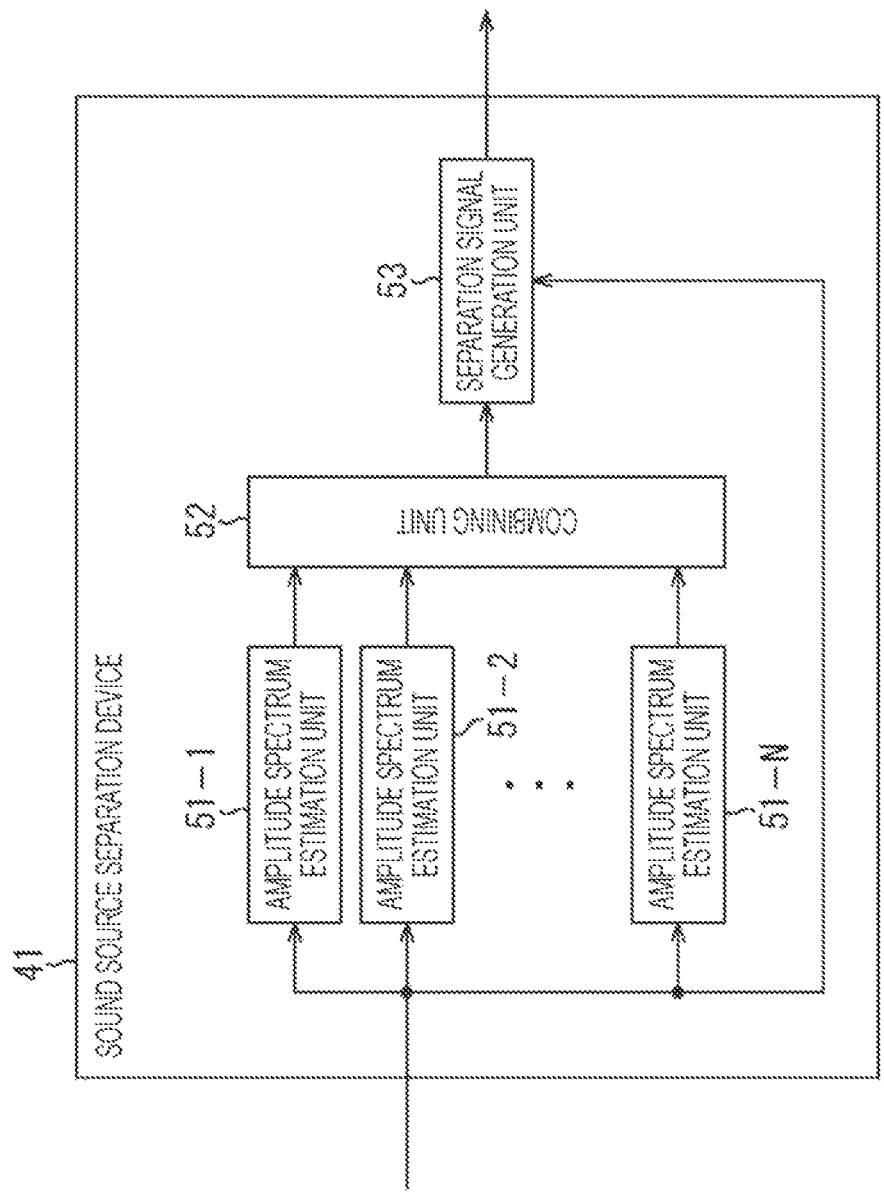
FIG. 2 is a diagram illustrating a configuration example of the sound source separation device.

FIG. 2 illustrates a configuration example of a sound source separation device to which the present technology is applied.

The sound source separation device 41 shown in FIG. 2 includes amplitude spectrum estimation units 51-1 to 51-N, a combining unit 52, and a separation signal generation unit 53. In the sound source separation device 41, the amplitude spectrum estimation units 51-1 to 51-N and the separation signal generation unit 53 are supplied with a mixed sound signal x(k, m).

According to amplitude spectrum estimation algorithms that differ from each other, in other words, by sound source separation systems that differ from each other, the amplitude spectrum estimation units 51-1 to 51-N determine amplitude spectra $\hat{s}_j(k,m)$ by estimation from the mixed sound signal x(k, m), and supply the amplitude spectra $\hat{s}_j(k,m)$ to the combining unit 52. In other words, the amplitude spectra $\hat{s}_j(k,m)$ are separated from the mixed sound signals x(k,m) as sound source separation signals of respective sound sources.

It should be noted that in a case where it is not particularly necessary to distinguish the amplitude spectrum estimation units 51-1 to 51-N, hereinafter, the amplitude spectrum estimation units 51-1 to 51-N are merely referred to as amplitude spectrum estimation units 51. These amplitude spectrum estimation units 51 are amplitude spectrum estimators.

The combining unit 52 combines the amplitude spectra $\hat{s}_j(k,m)$ supplied from the N pieces of amplitude spectrum estimation units 51 to make one final amplitude spectrum $\hat{s}_j(k,m)$, and supplies (outputs) the final amplitude spectrum $\hat{s}_j(k,m)$ to the separation signal generation unit 53.

On the basis of the supplied mixed sound signal $x(k,m)$ and the amplitude spectrum $\hat{s}_j(k,m)$ supplied from the combining unit 52, the separation signal generation unit 53 performs processing of adding a phase to the amplitude spectrum $\hat{s}_j(k,m)$ of the target sound source, thereby calculating and outputting an estimated value of a source signal of the target sound source.

Here, as the amplitude spectrum estimation algorithm in the amplitude spectrum estimation unit 51, it is possible to employ, for example, a feedforward type neural network (Feedforward Neural Network (FNN)) including Convolutional Neural Network (CNN) and Residual Network (ResNet), a recurrent type neural network (Recurrent Neural Network (RNN)), Densely connected convolutional Networks (DenseNet), Non-negative Matrix Factorization (NMF), or the like. In addition, the above-described network may be realized at arbitrary accuracy including binary net.

Figure 3:
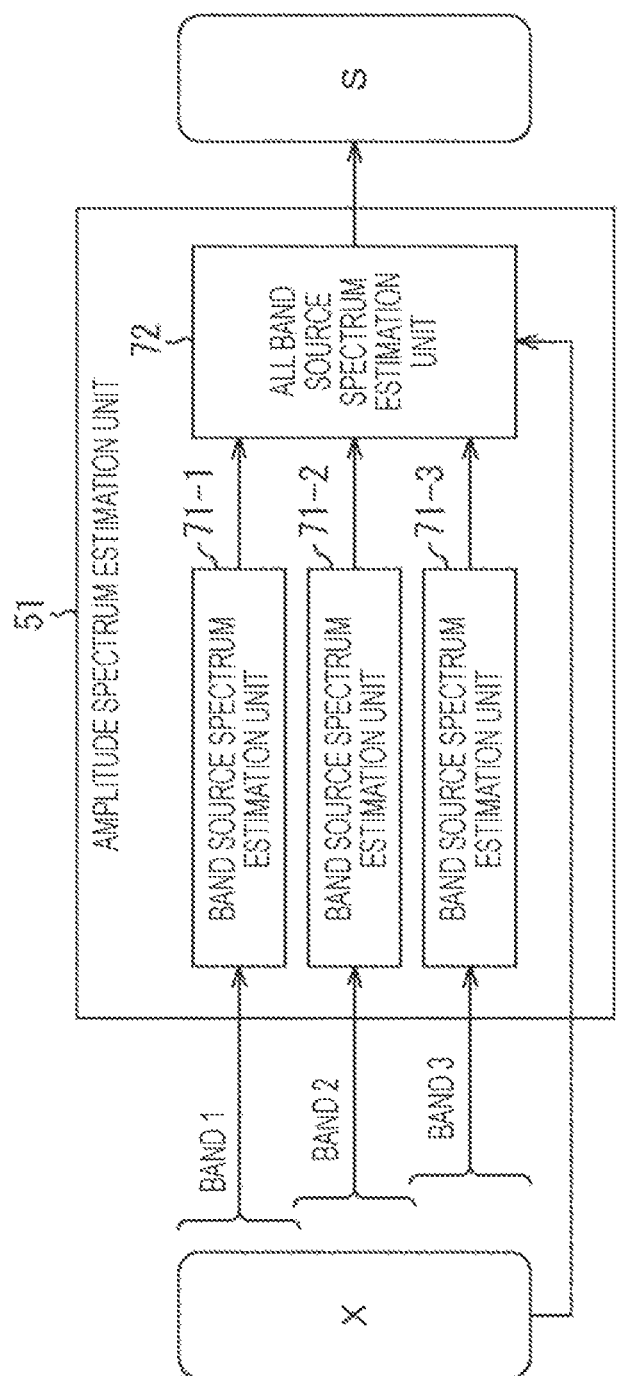
FIG. 3 is a diagram illustrating a configuration example of an amplitude spectrum estimation unit.

Moreover, as the amplitude spectrum estimation algorithm in the amplitude spectrum estimation unit 51, as shown in, for example, FIG. 3, algorithms and networks that differ on a frequency band basis can be employed.

In the example shown in FIG. 3, the amplitude spectrum estimation unit 51 includes band source spectrum estimation units 71-1 to 71-3, and an all band source spectrum estimation unit 72.

A signal of a part or all of bands of a mixed sound spectrum that includes mixed sound signals $x(k,m)$ of respective frequency bins k is supplied to the band source spectrum estimation units 71-1 to 71-3.

The band source spectrum estimation units 71-1 to 71-3 receive, as input, the signal of a part or all of bands of the mixed sound spectrum, and estimate a signal of a part or all of bands of the source spectrum that includes the amplitude spectra $\hat{s}_j(k,m)$ of respective frequency bins k according to band source spectrum estimation algorithms that differ from one another.

For example, the band source spectrum estimation units 71-1 to 71-3 receive, as input, respective bands of the mixed sound spectrum, the bands differing from one another, and estimate signals of respective bands of the source spectrum, the bands differing from one another.

The band source spectrum estimation units 71-1 to 71-3 supply the signal of a part or all of the bands of the source spectrum, which has been obtained by estimation, to the all band source spectrum estimation unit 72 as a band spectrum.

It should be noted that in a case where it is not particularly necessary to distinguish the band source spectrum estimation units 71-1 to 71-3, hereinafter, the band source spectrum estimation units 71-1 to 71-3 are merely referred to as band source spectrum estimation units 71.

The all band source spectrum estimation unit 72 generates amplitude spectra of respective frequency bins k $\hat{s}_j(k,m)$ on the basis of the supplied mixed sound spectrum, and the band spectra supplied from the respective band source spectrum estimation units 71-1 to 71-3. In other words, the all band source spectrum estimation unit 72 integrates the band spectra supplied from each of the band source spectrum estimation units 71 according to the all band source spectrum estimation algorithm, and outputs amplitude spectra of respective frequency bins k $\hat{s}_j(k,m)$ as a source spectrum of all bands obtained by integration.

It should be noted that for example, DNN can be employed as the band source spectrum estimation algorithm in each of the band source spectrum estimation units 71, or as the all band source spectrum estimation algorithm in the all band source spectrum estimation unit 72.

In general, a spectrum pattern differs depending on a band. For example, in a low band, a sound has a relatively long continuation length, and there are many sounds each having tonality. Meanwhile, in a high band, a noise sound that exhibits fast attenuation and has no tonality may occur at higher frequency. Therefore, in order to grasp such characteristics that differ on a band basis, there is a possibility that it will be easier to estimate a source spectrum on a band basis. In addition, selecting the most suitable model size and algorithm on a band basis enables to achieve higher performance and efficiency.

Accordingly, the amplitude spectrum estimation unit 51 estimates a source spectrum on a band basis, and integrates those estimation results as the final source spectrum, thereby enabling to estimate a source spectrum more effectively and with higher accuracy.

Incidentally, with respect to the amplitude spectrum estimation algorithm in each of the amplitude spectrum estimation units 51, in a case where learning models differ from one another, for example, DNNs may be combined, or the like. In other words, even in the case of the same sound source separation system (amplitude spectrum estimation algorithm), for example, DNNs or the like, in a case where learning models thereof differ and output characteristics that differ from each other, even if those sound source separation systems are combined, separation performance can be enhanced.

As an example of a combination of amplitude spectrum estimation algorithms that differ from each other, in other words, as an example of a combination of sound source separation systems, it is considered that for example, DNN and LSTM are combined.

The estimation of the amplitude spectrum by DNN is superior in suppression of sounds other than a target sound source, in other words, suppression of nontarget sounds. However, an artifact tends to be large.

Meanwhile, the estimation of an amplitude spectrum by LSTM, which is a kind of recurrent type neural network (RNN) having combination in a time direction, exhibits stable performance in terms of time. However, leakage of nontarget sound tends to be large.

In this manner, performing sound source separation by combining the sound source separation systems, DNN and LSTM, which differ in output characteristics in terms of time, enables to estimate the amplitude spectrum with higher accuracy, and thereby to enhance the sound source separation performance. In other words, combining amplitude spectrum estimators that differ from each other enables to estimate the amplitude spectrum with higher accuracy, thereby to obtain a signal of a target sound source with higher accuracy.

By combining amplitude spectrum estimators that differ in characteristics of amplitude spectrum estimation algorithm, for example, in level or the like of interference in a separated signal, even in the case of a frame in which sufficient separation performance cannot be achieved by one amplitude spectrum estimation algorithm, there is a case where sufficient separation performance can be achieved by the other amplitude spectrum estimation algorithm. Therefore, combining these amplitude spectrum estimation algorithms consequently makes it possible to enhance the sound source separation performance as a whole.

Meanwhile, for example, even if a plurality of amplitude spectrum estimation algorithms, in which a magnitude relation of the separation performance such as a level of interference does not change at any time, are combined, it is difficult to expect an improvement in separation performance.

A case where DNN and LSTM are combined, as a plurality of sound source separation systems which differ in output characteristics in terms of time, will be described below as a specific example.

Figure 4:
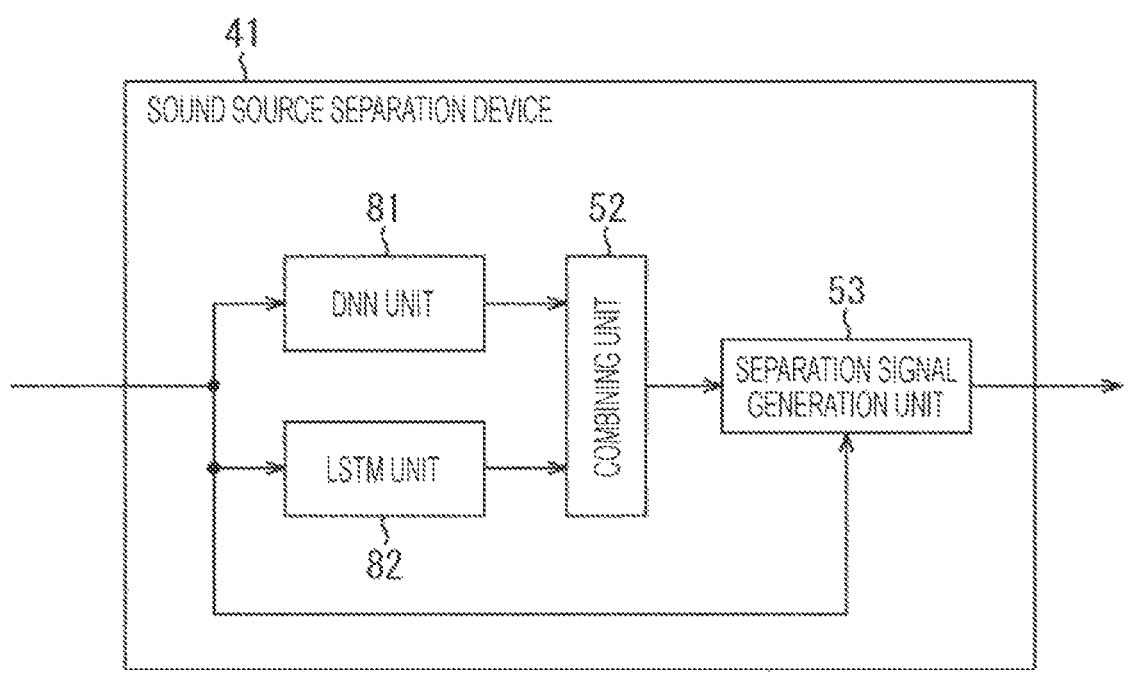
FIG. 4 is a diagram illustrating a configuration example of the sound source separation device.

In a case where DNN and LSTM are combined as sound source separation systems, the sound source separation device 41 shown in FIG. 2 is configured as shown in FIG. 4. It should be noted that in FIG. 4, identical reference numerals are used to denote parts corresponding to those shown in FIG. 2, and the description thereof will be accordingly omitted.

The sound source separation device 41 shown in FIG. 4 includes a DNN unit 81, a LSTM unit 82, a combining unit 52, and a separation signal generation unit 53. In this example, the DNN unit 81 and the LSTM unit 82 correspond to the amplitude spectrum estimation unit 51 shown in FIG. 2.

In other words, the DNN unit 81 is an amplitude spectrum estimator based on DNN that has been obtained by learning beforehand. The DNN unit 81 performs amplitude spectrum estimation on the basis of the supplied mixed sound signal x(k,m), and supplies a resultant amplitude spectrum $\hat{s}_j(k,m)$ to the combining unit 52.

Hereinafter, an amplitude spectrum $\hat{s}_j(k,m)$ obtained by, in particular, the DNN unit 81 is also referred to as an amplitude spectrum $\hat{s}_{j,DNN}(k,m)$.

The LSTM unit 82 is an amplitude spectrum estimator based on LSTM that has been obtained by learning beforehand. The LSTM unit 82 performs amplitude spectrum estimation on the basis of the supplied mixed sound signal x(k,m), and supplies a resultant amplitude spectrum $\hat{s}_j(k,m)$ to the combining unit 52.

Hereinafter, an amplitude spectrum $\hat{s}_j(k,m)$ obtained by, in particular, the LSTM unit 82 is also referred to as an amplitude spectrum $\hat{s}_{j,LSTM}(k,m)$.

The combining unit 52 combines the amplitude spectrum $\hat{s}_{j,DNN}(k,m)$ supplied from the DNN unit 81 with the amplitude spectrum $\hat{s}_{j,LSTM}(k,m)$ supplied from the LSTM unit 82 to make one final amplitude spectrum $\hat{s}_j(k,m)$, and supplies the final amplitude spectrum $\hat{s}_j(k,m)$ to the separation signal generation unit 53.

It should be noted that any method may be used as an amplitude spectrum combining method; for example, linear combination, combination by Artificial Neural Network (ANN), or the like, may be used. For example, in a case where combining is performed by ANN, at the time of ANN parameter learning, only ANN for combining may be learned, or learning may be performed including lower layer DNN and LSTM.

The combining unit 52 will be described below on the assumption that amplitude spectra are linearly combined. In a case where amplitude spectra are linearly combined, for example, the combining unit 52 calculates the following equation (5) to determine the amplitude spectrum $\hat{s}_j(k,m)$ as the combination result.

[Equation 5]

$$\hat{s}_j(k,m) = \lambda \hat{s}_{j,LSTM}(k,m) + (1-\lambda) \hat{s}_{j,DNN}(k,m) \quad (5)$$

It should be noted that λ indicates a combination parameter in equation (5). This combination parameter λ is a predetermined fixed value, and indicates weight of the amplitude spectrum $\hat{s}_{j,LSTM}(k,m)$ at the time of linear combination.

On the basis of the supplied mixed sound signal x(k,m) and the amplitude spectrum $\hat{s}_j(k,m)$ supplied from the combining unit 52, the separation signal generation unit 53 calculates a source signal of the target sound source by estimation, and outputs the source signal.

For example, the separation signal generation unit 53 calculates the above-described equations (3) and (4) on the basis of the amplitude spectrum $\hat{s}_j(k,m)$, thereby determining power spectrum density $\hat{v}_j(k,m)$ and spatial correlation matrix $\hat{R}_j(k)$ for each of J pieces of sound sources.

In addition, on the basis of the power spectrum density $\hat{v}_j(k,m)$ and the spatial correlation matrix $\hat{R}_j(k)$, and on the basis of the mixed sound signal x(k,m), the separation signal generation unit 53 calculates the above-described equation (2), and calculates, by MWF, a source signal $\hat{s}_{j,MWF}(k,m)$ that is an estimated separation sound spectrum of the target sound source.

It should be noted that when the equation (2) is calculated, the power spectrum density $\hat{v}_j(k,m)$ and the spatial correlation matrix $\hat{R}_j(k)$ are substituted into the equation (2) as the power spectrum density $v_j(k,m)$ and the spatial correlation matrix $R_j(k,m)$.

The calculation of such equation (2) is performed by adding a phase to the amplitude spectrum $\hat{s}_j(k,m)$ having no phase so as to determine a complex spectrum having a phase. In this case, the phase to be added is determined in such a manner that a mean square error is minimized.

Moreover, an example in which a source signal $\hat{s}_{j,MWF}(k,m)$ is calculated by MWF will be described here. However, in the separation signal generation unit 53, a source signal of a target sound source may be determined by DNN or the like on the basis of the mixed sound signal x(k,m) and the amplitude spectrum $\hat{s}_j(k,m)$.

As described above, in a case where the amplitude spectrum is estimated by DNN and LSTM and subsequently the estimation results are subjected to linear combination to calculate the source signal $\hat{s}_{j,MWF}(k,m)$ by MWF, it has been checked that high separation performance is achieved as shown in, for example, FIG. 5. Incidentally, in FIG. 5, the vertical axis indicates Signal to Distortion Ratio (SDR), and the horizontal axis indicates a value of the combination parameter λ.

Figure 5:
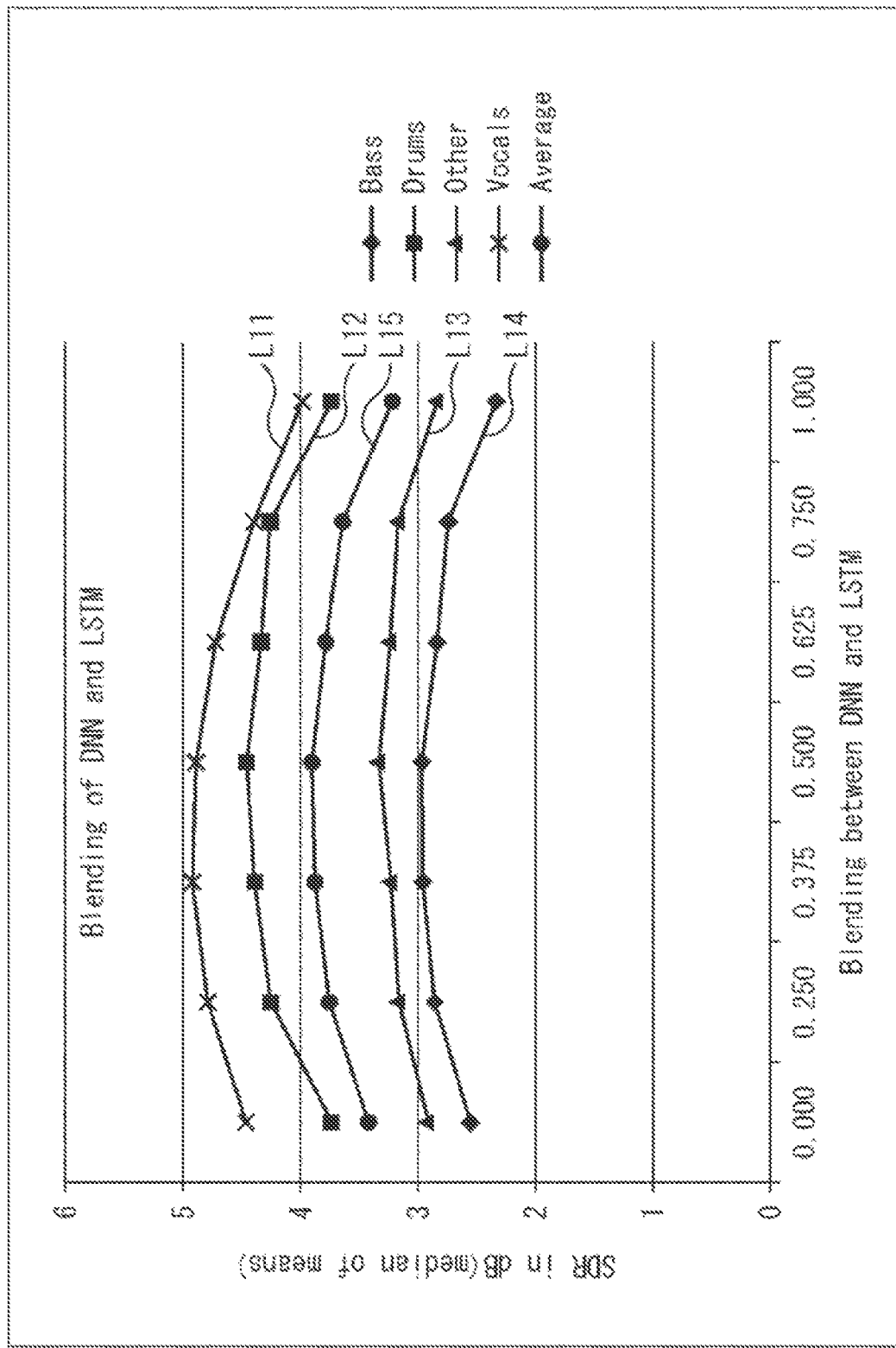
FIG. 5 is a diagram illustrating a combination parameter and separation performance.

In the example shown in FIG. 5, an acoustic signal including sounds of Vocals, Drums, Other and Bass is used as a mixed sound signal, and sound source separation is performed.

Curves L11 to L14 each indicate a size of SDR obtained when signals of Vocals, Drums, Other and Bass are extracted as a source signal on the assumption that the combination parameter λ has a value ranging from 0 to 1. In addition, a curve L15 indicates an average value of the curves L11 to L14.

As understood from the curves L11 to L15, it is revealed that in comparison with a case where the combination parameter λ=0, in other words, only DNN is used, and a case where the combination parameter λ=1, in other words, only LSTM is used, larger SDR is obtained in a case where combining is performed, for example, in a case where the combination parameter λ=0.5, in other words, outputs of DNN and LSTM are mixed at the same level. In other words, it is revealed that higher separation performance is achieved.

Here, a learning method for learning DNN used to obtain the amplitude spectrum $\hat{s}_{j,DNN}(k,m)$ of a source sound source from the mixed sound signal x(k,m), and LSTM used to obtain an amplitude spectrum $\hat{s}_{j,LSTM}(k,m)$ of the source sound source from the mixed sound signal x(k,m) will be described.

In the learning of DNN and LSTM, input of a network is an amplitude spectrum |x(k,m)| of a mixed sound signal, and teacher data is a source sound, that is to say, an amplitude spectrum $|s_j(k,m)|$ of a sound of the target sound source.

On the assumption that a nonlinear function by the network is f(,θ), a network parameter θ requires that a square error between a nonlinear function and an amplitude spectrum of a source sound is minimized. Here, an objective function L that should be minimized is represented by the following equation (6).

[Equation 6]

$$L = \sum_{k,m} \|f(|x(k,m)|, \theta) - |s_j(k,m)|\|^2 \quad (6)$$

When the amplitude spectrum is estimated by DNN and LSTM, the mixed sound signal x(k,m), in further detail, the amplitude spectrum of the mixed sound signal x(k,m), is substituted into a nonlinear function f(|x(k,m)|,θ) obtained in such a manner, thereby determining the amplitude spectrum $\hat{s}_{j,DNN}(k,m)$ and the amplitude spectrum $\hat{s}_{j,LSTM}(k,m)$.

<Explanation of Sound Source Separation Processing>

Next, the operation of the sound source separation device 41 shown in FIG. 4 will be described.

Figure 6:
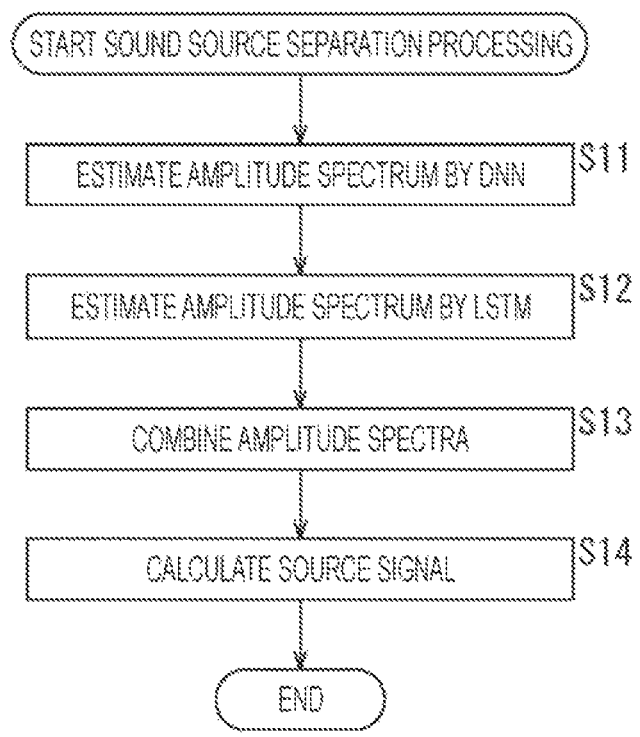
FIG. 6 is a flowchart illustrating sound source separation processing.

In other words, the sound source separation processing by the sound source separation device 41 will be described below with reference to a flowchart shown in FIG. 6.

In a step S11, the DNN unit 81 estimates an amplitude spectrum by DNN on the basis of the supplied mixed sound signal x(k,m), and supplies the resultant amplitude spectrum $\hat{s}_{j,DNN}(k,m)$ to the combining unit 52.

For example, in the step S11, the mixed sound signal x(k,m) is substituted into the nonlinear function f(|x(k,m)|,θ) obtained by learning of DNN, thereby calculating the amplitude spectrum $\hat{s}_{j,DNN}(k,m)$.

In a step S12, the LSTM unit 82 estimates an amplitude spectrum by LSTM on the basis of the supplied mixed sound signal x(k,m), and supplies the resultant amplitude spectrum $\hat{s}_{j,LSTM}(k,m)$ to the combining unit 52.

For example, in the step S12, the mixed sound signal x(k,m) is substituted into the nonlinear function f(|x(k,m)|,θ) obtained by learning of LSTM, thereby calculating the amplitude spectrum $\hat{s}_{j,LSTM}(k,m)$.

In a step S13, the combining unit 52 combines the amplitude spectrum $\hat{s}_{j,LSTM}(k,m)$ supplied from the DNN unit 81 with the amplitude spectrum $\hat{s}_{j,LSTM}(k,m)$ supplied from the LSTM unit 82, and supplies the resultant amplitude spectrum $\hat{s}_j(k,m)$ to the separation signal generation unit 53. For example, in the step S13, the calculation of the above-described equation (5) is carried out, and the amplitude spectrum $\hat{s}_j(k,m)$ is calculated by linear combination.

In a step S14, the separation signal generation unit 53 calculates the source signal $\hat{s}_{j,MWF}(k,m)$ of the target sound source by estimation on the basis of the supplied mixed sound signal x(k,m) and the amplitude spectrum $\hat{s}_j(k,m)$ supplied from the combining unit 52, and then outputs the source signal $\hat{s}_{j,MWF}(k,m)$. Subsequently, the sound source separation processing ends.

For example, in the step S14, the calculations of the equations (3) and (4) are carried out by the amplitude spectrum $\hat{s}_j(k,m)$, and the calculation of the equation (2) is carried out from those calculation results and the mixed sound signal x(k,m), thereby calculating the source signal $\hat{s}_{j,MWF}(k,m)$.

As described above, the sound source separation device 41 estimates an amplitude spectrum by sound source separation systems, DNN and LSTM, which differ in characteristics from each other, and calculates a source signal of the target sound source on the basis of the amplitude spectrum obtained by combining those estimation results.

As the result, high separation performance can be stably achieved irrespective of characteristics of the sound source. In other words, noises, leakage of nontarget sounds, an artifact and the like can be reduced, thereby enabling to achieve higher separation performance. In particular, the sound source separation device 41 is capable of achieving higher separation performance by combining a plurality of amplitude spectrum estimation algorithms in which calculation costs are low.

In addition, even when a malfunction has occurred in a part of the amplitude spectrum estimation unit 51, for example, in the DNN unit 81, the LSTM unit 82, or the like, the amplitude spectrum that is dynamically combined in the combining unit 52 can be changed, and therefore the sound source separation can be robustly performed.

Second Embodiment

Configuration Example of Sound Source Separation Device

Incidentally, the case where amplitude spectra are linear combined by using the predetermined combination parameter λ in the combining unit 52 has been described above. However, the combination parameter λ may be dynamically determined.

In such a case, for example, in a case where a mixed sound signal x(k,m) in which LSTM is superior is input, the combination parameter λ is set at a large value so as to put a larger weight on the amplitude spectrum obtained by LSTM at the time of combination. As the result of such a configuration, the estimated accuracy of the amplitude spectrum is further enhanced, and consequently the sound source separation performance can be enhanced.

Figure 7:
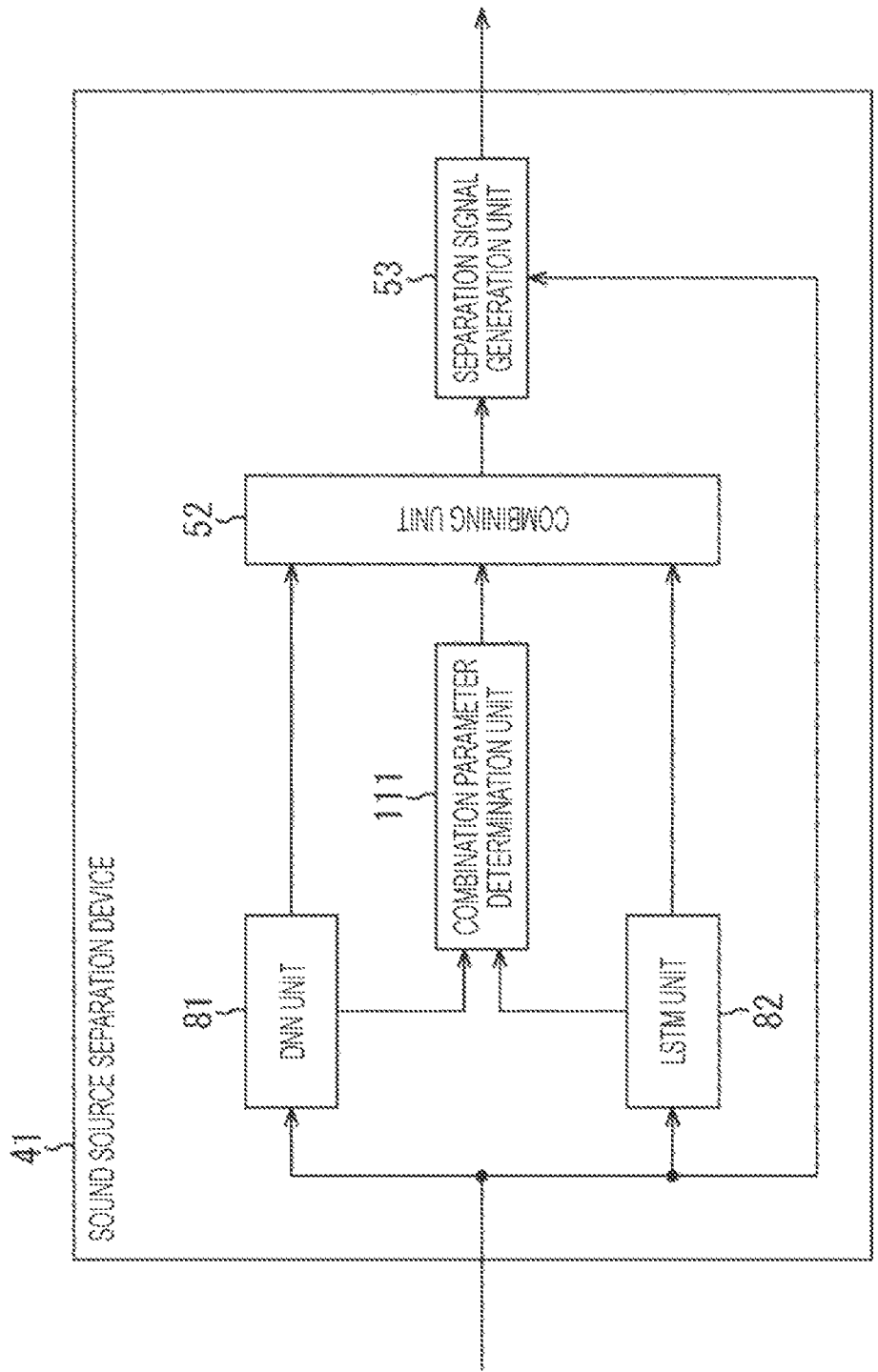
FIG. 7 is a diagram illustrating a configuration example of the sound source separation device.

In this manner, in a case where the combination parameter λ is dynamically determined, the sound source separation device 41 is configured as shown in, for example, FIG. 7. It should be noted that in FIG. 7, identical reference numerals are used to denote parts corresponding to those shown in FIG. 4, and the description thereof will be accordingly omitted.

A configuration of the sound source separation device 41 shown in FIG. 7 differs from the configuration of the sound source separation device 41 shown in FIG. 4 in that a combination parameter determination unit 111 is newly provided. The configuration other than the above is the same as that of the sound source separation device 41 shown in FIG. 4.

In other words, the sound source separation device 41 shown in FIG. 7 includes the DNN unit 81, the LSTM unit 82, the combination parameter determination unit 111, the combining unit 52, and the separation signal generation unit 53.

By using a separation performance evaluation function $D^{DNN}(y)$, which is a discriminator obtained by learning beforehand, the DNN unit 81 calculates estimated performance of the amplitude spectrum by the DNN unit 81, in other words, an evaluation value $D^{DNN}$ of the separation performance of a signal of a target sound source, and supplies the estimated performance to the combination parameter determination unit 111.

By using a separation performance evaluation function $D^{LSTM}(y)$ which is a discriminator obtained by learning beforehand, the LSTM unit 82 calculates estimated performance of the amplitude spectrum by the LSTM unit 82, in other words, an evaluation value $D^{LSTM}$ of the separation performance of a signal of a target sound source, and supplies the estimated performance to the combination parameter determination unit 111.

The combination parameter determination unit 111 determines the combination parameter λ on the basis of the evaluation value $D^{DNN}$ supplied from the DNN unit 81 and the evaluation value $D^{LSTM}$ supplied from the LSTM unit 82, and supplies the combination parameter λ to the combining unit 52.

It should be noted that in a case where it is not particularly necessary to distinguish between the separation performance evaluation function $D^{DNN}(y)$ and the separation performance evaluation function $D^{LSTM}(y)$, hereinafter, the separation performance evaluation function $D^{DNN}(y)$ and the separation performance evaluation function $D^{LSTM}(y)$ are merely referred to as separation performance evaluation functions D(y).

By using the combination parameter λ supplied from the combination parameter determination unit 111, the combining unit 52 combines the amplitude spectrum $\hat{s}_{j,DNN}(k,m)$ supplied from the DNN unit 81 with the amplitude spectrum $\hat{s}_{j,LSTM}(k,m)$ supplied from the LSTM unit 82, and supplies the obtained amplitude spectrum $\hat{s}_j(k,m)$ to the separation signal generation unit 53.

In the sound source separation device 41 shown in FIG. 7, each sound source separation system, in other words, the separation performance evaluation function D(y), which is a function of evaluating the separation performance in each amplitude spectrum estimation algorithm, is determined beforehand by learning such as DNN, and is held in the DNN unit 81 and the LSTM unit 82. In addition, the combination parameter determination unit 111 is controlled in such a manner that a larger weight is put on the amplitude spectrum estimation algorithm, the separation performance of which is higher.

Here, an example in which the separation performance evaluation function D(y) is configured by DNN will be described.

In this case, for example, the separation performance evaluation function D(y) can be configured to learn as such a discriminator that in a case where a source signal $s_j(k,m)$ of a sound of an actual sound source is substituted into the separation performance evaluation function D(y) as an argument y, outputs 1, and in a case where the amplitude spectrum after the sound source separation, in other words, an estimated value of the source signal $s_j(k,m)$, is substituted into the separation performance evaluation function D(y) as the argument y, outputs 0.

A cost function L of such separation performance evaluation function D(y) is represented by the following equation (7).

[Equation 7]

$$L = \sum_{k,m} -\log D(|s_j(k,m)|) - \log(1 - D(\hat{s}_j)) \quad (7)$$

It should be noted that in the equation (7), $\hat{s}_j$ indicates an estimated value of the amplitude spectrum of the source signal $s_j(k,m)$. Therefore, for example, if the separation performance evaluation function D(y) is the separation performance evaluation function $D^{DNN}(y)$, $\hat{s}_j$ of the equation (7) becomes the amplitude spectrum $\hat{s}_{j,DNN}(k,m)$. In addition, for example, if the separation performance evaluation function D(y) is the separation performance evaluation function $D^{LSTM}(y)$, $\hat{s}_j$ of the equation (7) becomes the amplitude spectrum $\hat{s}_{j,LSTM}(k,m)$.

Moreover, in this example, the separation performance evaluation function D(y) is DNN, and the final output layer thereof is represented by a sigmoid function shown in the following equation (8).

[Equation 8]

$$D(y) = \text{sigmoid}(a) \quad (8)$$

It should be noted that a in the equation (8) indicates input into the final output layer, in other words, output of the immediately preceding layer.

From the definition, the separation performance evaluation function D(y) is (0, 1), in other words, represents posteriori probability in which a value ranges from 0 to 1, and in which the argument y is an amplitude spectrum of the source signal $s_j(k,m)$.

In other words, the evaluation value $D^{DNN}$ or the evaluation value $D^{LSTM}$, which is output of the separation performance evaluation function D(y), indicates probability that the amplitude spectrum $\hat{s}_{j,DNN}(k,m)$ or the amplitude spectrum $\hat{s}_{j,LSTM}(k,m)$, which has been input, is an amplitude spectrum of the source signal $s_j(k,m)$.

In other words, the evaluation value $D^{DNN}$ indicates the probability of being a signal of the target sound source obtained with respect to the amplitude spectrum $\hat{s}_{j,DNN}(k,m)$, and the evaluation value $D^{LSTM}$ indicates the probability of being a signal of the target sound source obtained with respect to the amplitude spectrum $\hat{s}_{j,LSTM}(k,m)$.

Therefore, with the increase in evaluation value that is the output of the separation performance evaluation function D(y), the estimated accuracy of the amplitude spectrum becomes higher, and the estimated error decreases.

The DNN unit 81 and the LSTM unit 82 hold the separation performance evaluation function $D^{DNN}(y)$ and the separation performance evaluation function $D^{LSTM}(y)$ which have been learned beforehand as described above.

In addition, the combination parameter determination unit 111 calculates the combination parameter λ by calculating, for example, the following equation (9) from the evaluation value $D^{DNN}$ obtained by the DNN unit 81, and the evaluation value $D^{LSTM}$ obtained by the LSTM unit 82.

[Equation 9]

$$\lambda = \frac{D^{LSTM}}{D^{LSTM} + D^{DNN}} \quad (9)$$

It should be noted that when the combination parameter λ is determined, the combination parameter λ may be calculated by the equation (9), or the combination parameter λ may be determined by using the threshold value processing or the magnitude relation of the evaluation value.

For example, if the larger value between the evaluation value $D^{DNN}$ and the evaluation value $D^{LSTM}$ is a predetermined threshold value or more, the weight of the amplitude spectrum corresponding to the evaluation value that is higher than or equal to the threshold value is determined to be 1, and if not, the combination parameter $\lambda$ may be determined by the equation (9).

Therefore, in this case, for example, in a case where the evaluation value $D^{DNN}$ is larger than the evaluation value $D^{LSTM}$, and at the same time, the evaluation value $D^{DNN}$ is the threshold value or more, the combination parameter $\lambda=0$, and the amplitude spectrum $\hat{s}_{j,DNN}(k,m)$ is determined to be the amplitude spectrum $\hat{s}_j(k,m)$ without any change.

In addition, for example, in a case where one evaluation value is continuously larger than the other evaluation value during the predetermined number of frames, the weight of the amplitude spectrum corresponding to the one evaluation value is determined to be 1, and if not, the combination parameter $\lambda$ may be determined by the equation (9).

If the combination parameter $\lambda$ is determined on the basis of the evaluation value $D^{DNN}$ and the evaluation value $D^{LSTM}$ as described above, the estimated accuracy of the amplitude spectrum can be enhanced, and consequently the separation performance of the sound source can be further enhanced.

In particular, in this embodiment, even when a malfunction has occurred in one amplitude spectrum estimation algorithm between DNN and LSTM, it is not necessary to manually determine the combination parameter $\lambda$ again, and therefore the sound source separation can be robustly performed.

Moreover, the technique in which an evaluation value is calculated on an amplitude spectrum estimation algorithm basis, and the combination parameter $\lambda$ is calculated from those evaluation values, can also be applied to a case where three or more amplitude spectrum estimation algorithms are combined.

<Explanation of Sound Source Separation Processing>

Figure 8:
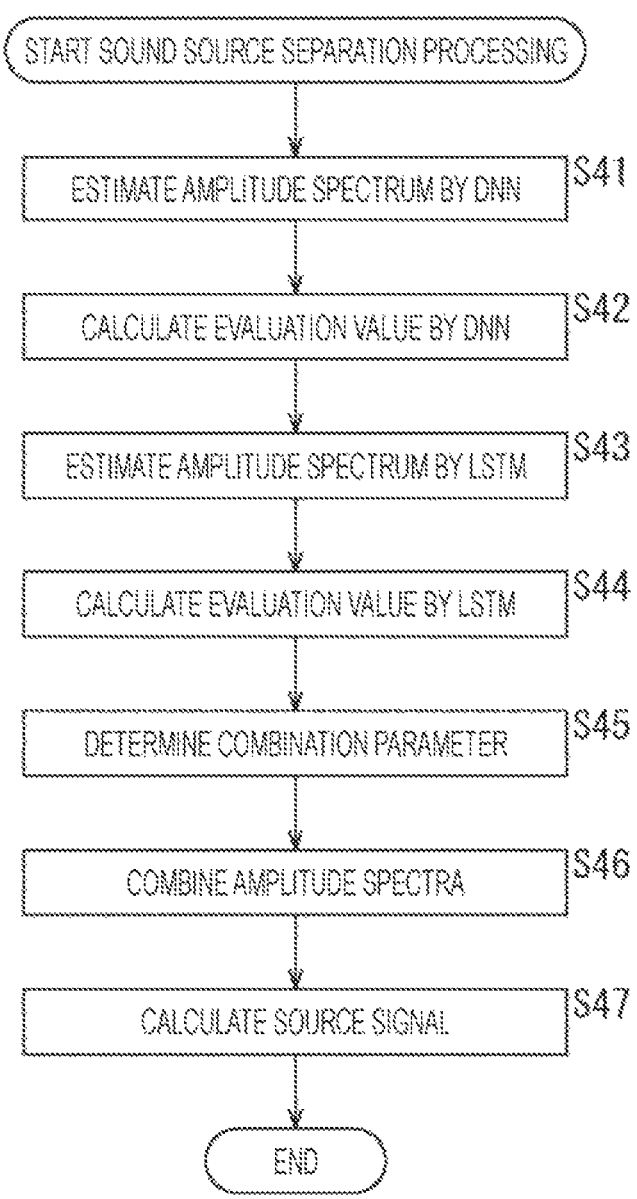
FIG. 8 is a flowchart illustrating sound source separation processing.

Subsequently, sound source separation processing by the sound source separation device 41 shown in FIG. 7 will be described with reference to a flowchart shown in FIG. 8. It should be noted that processing of a step S41 is similar to the processing of the step S11 in FIG. 6, and therefore the description thereof will be omitted.

In a step S42, the DNN unit 81 substitutes the amplitude spectrum $\hat{s}_{j,DNN}(k,m)$ obtained in the step S41 into the separation performance evaluation function $D^{DNN}$ (y) to calculate the evaluation value $D^{DNN}$ of the amplitude spectrum estimation by DNN, and supplies the evaluation value $D^{DNN}$ to the combination parameter determination unit 111.

After the evaluation value $D^{DNN}$ is calculated, processing of a step S43 is then performed. However, processing of the step S43 is similar to the processing of the step S12 in FIG. 6, and therefore the description thereof will be omitted.

In a step S44, the LSTM unit 82 substitutes the amplitude spectrum $\hat{s}_{j,LSTM}(k,m)$ obtained in the step S43 into the separation performance evaluation function $D^{LSTM}$ (y) to calculate the evaluation value $D^{LSTM}$ of the amplitude spectrum estimation by LSTM, and supplies the evaluation value $D^{LSTM}$ to the combination parameter determination unit 111.

In a step S45, the combination parameter determination unit 111 determines the combination parameter $\lambda$ on the basis of the evaluation value $D^{DNN}$ supplied from the DNN unit 81 and the evaluation value $D^{LSTM}$ supplied from the LSTM unit 82, and supplies the combination parameter $\lambda$ to the separation signal generation unit 53.

For example, the combination parameter determination unit 111 calculates the combination parameter $\lambda$ by calculating the above-described equation (9).

After the combination parameter $\lambda$ is calculated, processings of a step S46 and a step S47 are then performed, and the sound source separation processing ends. However, these processings are similar to the processings of the step S13 and the step S14 in FIG. 6, and therefore the description thereof will be omitted.

As described above, the sound source separation device 41 estimates the amplitude spectrum by sound source separation systems, DNN and LSTM, which differ in characteristics from each other, and determines the combination parameter on the basis of evaluation values of the estimation results. In addition, the sound source separation device 41 combines the amplitude spectrum obtained by the estimation on the basis of the obtained combination parameter, and calculates a source signal of the target sound source. This enables to achieve higher separation performance.

Third Embodiment

Configuration Example of Sound Source Separation Device

Moreover, in the above description, the example in which after the plurality of amplitude spectra are combined, the source signal is determined has been explained. However, the final source signal may be determined by determining a source signal for each of a plurality of amplitude spectrum estimation algorithms, and then combining those source signals.

Figure 9:
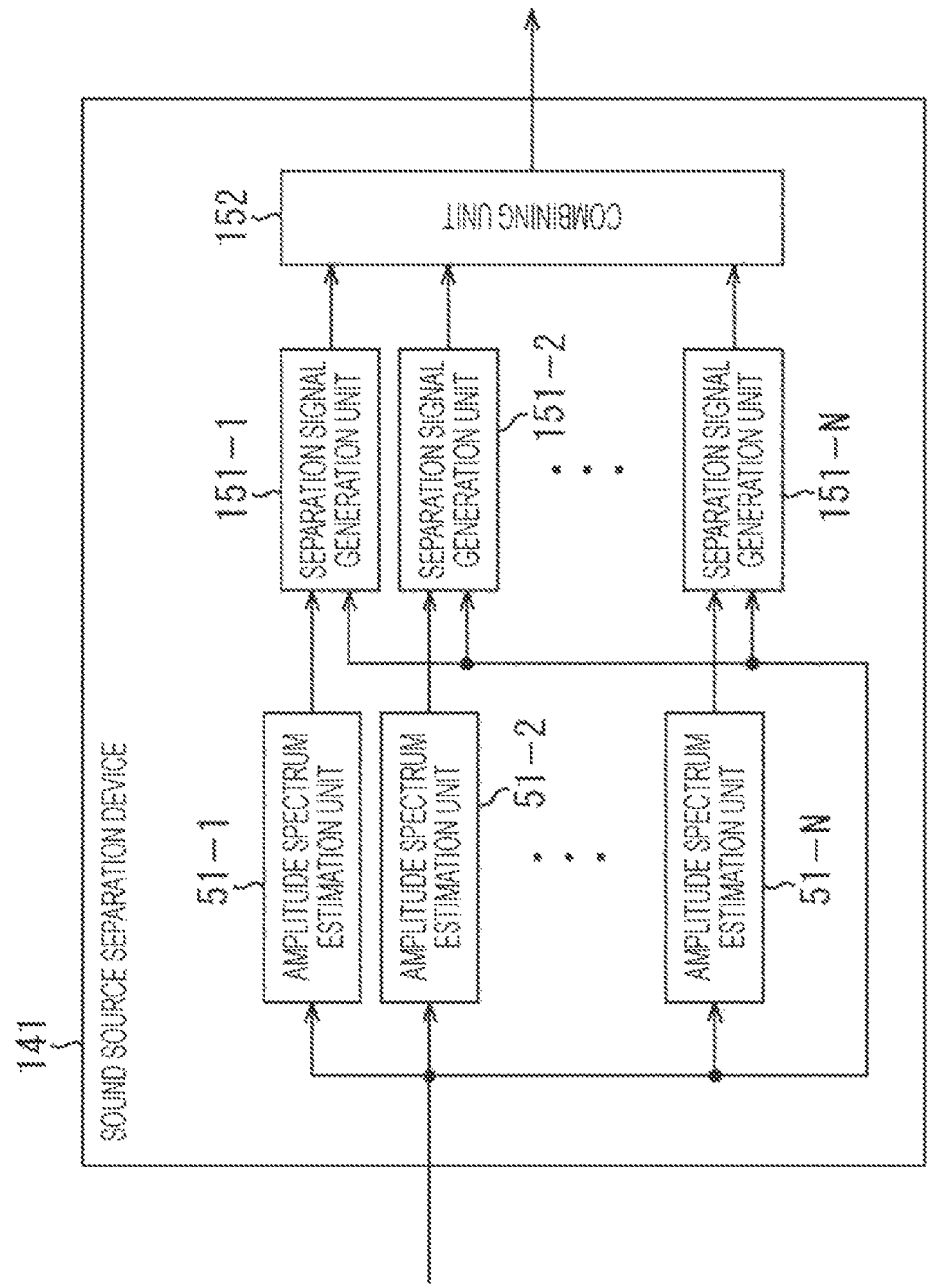
FIG. 9 is a diagram illustrating a configuration example of the sound source separation device.

In such a case, the sound source separation device is configured as shown in, for example, FIG. 9. It should be noted that in FIG. 9, identical reference numerals are used to denote parts corresponding to those shown in FIG. 2, and the description thereof will be accordingly omitted.

The sound source separation device 141 shown in FIG. 9 includes the amplitude spectrum estimation units 51-1 to 51-N, separation signal generation units 151-1 to 151-N, and a combining unit 152.

The separation signal generation units 151-1 to 151-N each calculate an estimated value of a source signal of a target sound source on the basis of the amplitude spectrum supplied from the amplitude spectrum estimation units 51-1 to 51-N and the supplied mixed sound signal x(k,m), and each supplies the estimated value to the combining unit 152.

For example, each of the separation signal generation units 151-1 to 151-N calculates the above-described equations (2) to (4), and consequently a source signal $\hat{s}_{j,MWF}(k,m)$ is calculated.

The combining unit 152 combines the source signals supplied from the separation signal generation units 151-1 to 151-N, and then outputs the obtained source signal as the final source signal.

For example, the combining unit 152 may combine source signals by linear combination, in other words, by determining the linear sum, or may perform combination by other methods, for example, by combining source signals by ANN. It should be noted that in a case where the linear combination is performed, as with the case in the second embodiment described above, the combination parameter may be dynamically determined.

As described above, even by generating a source signal on an amplitude spectrum estimation algorithm basis, in other words, on a sound source separation system basis, and then by combining those source signals to obtain the final source signal, high separation performance can be achieved as with the above-described sound source separation device 41.

Fourth Embodiment

Configuration Example of Sound Source Separation Device

In addition, the method for estimating a source signal is not limited to the MWF-based sound source separation technique. Any other technique may be employed.

For example, a plurality of sound source separation systems, each of which directly determines a source signal from the mixed sound signal x(k,m) by estimation, may be combined. In such a case, the sound source separation device is configured as shown in, for example, FIG. 10. It should be noted that in FIG. 10, identical reference numerals are used to denote parts corresponding to those shown in FIG. 9, and the description thereof will be accordingly omitted.

Figure 10:
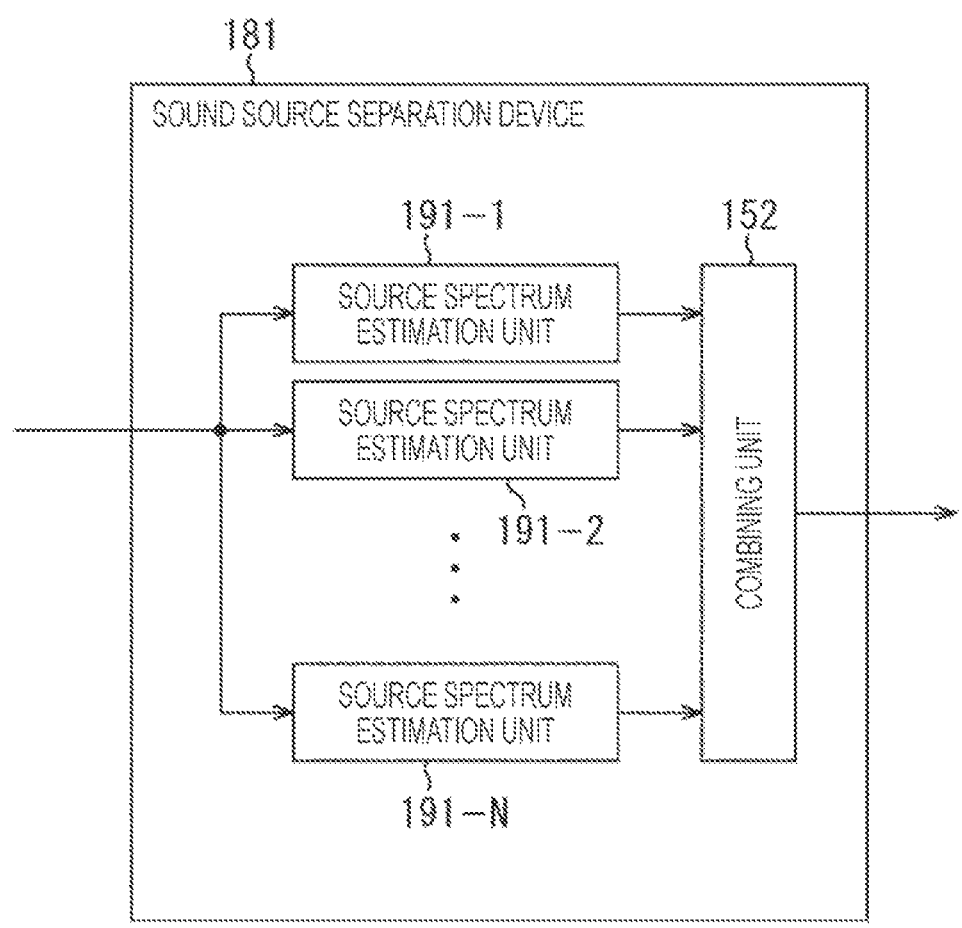
FIG. 10 is a diagram illustrating a configuration example of the sound source separation device.

A sound source separation device 181 shown in FIG. 10 includes source spectrum estimation units 191-1 to 191-N, and the combining unit 152.

According to complex spectrum estimation algorithms that differ from each other, in other words, by sound source separation systems that differ from each other, the source spectrum estimation units 191-1 to 191-N each calculate an estimated value of the source signal $s_j(k,m)$ from the supplied mixed sound signal x(k,m), and each supply the estimated value to the combining unit 152. In other words, the estimated value of the source signal $s_j(k,m)$ is separated from the mixed sound signal x(k,m) as a sound source separation signal of each sound source. The source signal output from each of the source spectrum estimation units 191-1 to 191-N is an estimated value of the source signal $s_j(k,m)$ that includes complex spectra for respective I pieces of channels.

It should be noted that in a case where it is not particularly necessary to distinguish the source spectrum estimation units 191-1 to 191-N, hereinafter, the source spectrum estimation units 191-1 to 191-N are merely referred to as source spectrum estimation units 191.

Each of the source spectrum estimation units 191 holds, for example, DNN and LSTM that have learned to estimate the source signal $s_j(k,m)$ from the mixed sound signal x(k,m). The source signal is estimated by using those DNN and LSTM.

Therefore, for example, when a source signal is estimated by the DNN and LSTM, an estimated value of the source signal $s_j(k,m)$ is determined by substituting the mixed sound signal x(k,m) into a nonlinear function obtained by learning.

It should be noted that the estimation technique for estimating a source signal, which is carried out in each of the plurality of source spectrum estimation units 191, in other words, the combination of sound source separation systems, is not limited to DNN and LSTM. CNN, ResNet, NMF and the like may be combined. In addition, in a case where the linear combination is performed in the combining unit 152, the combination parameter may be dynamically determined as with the case in the second embodiment.

Configuration Example of Computer

Incidentally, the series of processing described above can be executed by hardware, and can also be executed by software. In a case where the series of processing is executed by software, a program that configures the software is installed in a computer. Here, the computer includes a computer that is built into dedicated hardware, and a computer that is capable of executing various kinds of functions by installing various kinds of programs, for example, a general-purpose computer, and the like.

Figure 11:
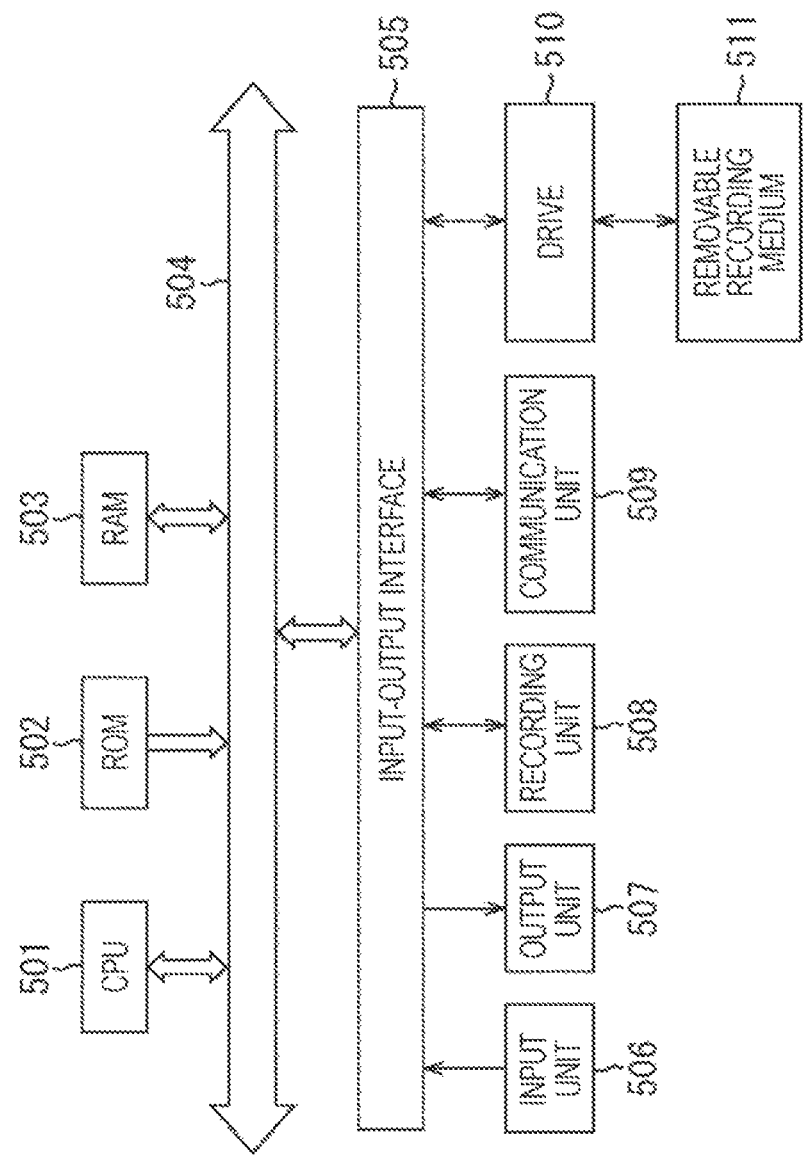
FIG. 11 is a diagram illustrating a configuration example of a computer.

FIG. 11 is a block diagram illustrating, as an example, a hardware configuration of a computer that executes the above-described series of processing by a program.

In the computer, a Central Processing Unit (CPU) 501, a Read Only Memory (ROM) 502, and a Random Access Memory (RAM) 503 are mutually connected through a bus 504.

An input-output interface 505 is further connected to the bus 504. An input unit 506, an output unit 507, a recording unit 508, a communication unit 509, and a drive 510 are connected to the input-output interface 505.

The input unit 506 includes a keyboard, a mouse, a microphone, an image pickup element, and the like. The output unit 507 includes a display, a speaker, and the like. The recording unit 508 includes a hard disk, a nonvolatile memory, and the like. The communication unit 509 includes a network interface or the like. The drive 510 drives a removable recording media 511 such as a magnetic disk, an optical disk, a magneto-optical disk, or a semiconductor memory.

In the computer that is configured as described above, the CPU 501 loads, for example, a program stored in the recording unit 508 into the RAM 503 through the input-output interface 505 and the bus 504, then executes the program, and consequently the above-described series of processing is performed.

The program executed by the computer (CPU 501) can be provided by being recorded, for example, in a removable recording media 511 such as a package media. In addition, the program can be provided through a wired or wireless transmission medium such as a local area network, the Internet, and digital satellite broadcasting.

In the computer, the program can be installed in the recording unit 508 through the input-output interface 505 by mounting the removable recording media 511 to the drive 510. In addition, the program can be received by the communication unit 509 through a wired or wireless transmission medium, and can be installed in the recording unit 508. Besides the above, the program can be installed in the ROM 502 or the recording unit 508 beforehand.

It should be noted that the program executed by the computer may be a program in which processing is time-sequentially performed along the order described in the present description, or may be a program in which processing is performed in parallel or in the required timing, for example, when a call is made.

In addition, embodiments of the present technology are not limited to the embodiments described above. Various modifications can be made within the scope that does not deviate from the gist of the present technology.

For example, the present technology can be configured as cloud computing in which one function is processed by being shared by a plurality of devices in cooperation through a network.

Further, each step explained in the above-described flowchart is executed by one device. However, the each step can be executed by being shared by a plurality of devices.

Furthermore, in a case where one step includes a plurality of processings, the plurality of processings included in the one step are executed by one device. However, the plurality of processings can be executed by being shared by a plurality of devices.

In addition, the effects described in the present description are to be construed as merely illustrative, and are not limitative, and other effects may be produced.

Moreover, the present technology may have the following configuration.

(1)

A sound source separation device including a combining unit that combines a first sound source separation signal of a predetermined sound source, the first sound source separation signal being separated from a mixed sound signal by a first sound source separation system, with a second sound source separation signal of the sound source, the second sound source separation signal being separated from the mixed sound signal by a second sound source separation system that differs in separation performance from the first sound source separation system in predetermined units of time, and that outputs a sound source separation signal obtained by the combination.

(2)

The sound source separation device set forth in (1), in which the combining unit linearly combines the first sound source separation signal with the second sound source separation signal on the basis of a combination parameter.

(3)

The sound source separation device set forth in (2), further including a combination parameter determination unit that determines the combination parameter on the basis of a probability of being a signal of the sound source obtained with respect to the first sound source separation signal, and a probability of being a signal of the sound source obtained with respect to the second sound source separation signal.

(4)

The sound source separation device set forth in any one of (1) to (3), in which the separation performance is SIR, SAR, SDR or ISR.

(5)

The sound source separation device set forth in any one of (1) to (4), in which a magnitude relation between the separation performance of the first sound source separation system and the separation performance of the second sound source separation system changes with time.

(6)

The sound source separation device set forth in any one of (1) to (5), in which the first sound source separation system is the same as the second sound source separation system.

(7)

The sound source separation device set forth in any one of (1) to (5), in which the first sound source separation system is any of FNN, RNN and NMF, and the second sound source separation system is any of FNN, RNN and NMF.

(8)

A sound source separation method including the step of combining a first sound source separation signal of a predetermined sound source, the first sound source separation signal being separated from a mixed sound signal by a first sound source separation system, with a second sound source separation signal of the sound source, the second sound source separation signal being separated from the mixed sound signal by a second sound source separation system that differs in separation performance from the first sound source separation system in predetermined units of time, and outputting a sound source separation signal obtained by the combination.

(9)

A program for causing a computer to execute processing including the step of combining a first sound source separation signal of a predetermined sound source, the first sound source separation signal being separated from a mixed sound signal by a first sound source separation system, with a second sound source separation signal of the sound source, the second sound source separation signal being separated from the mixed sound signal by a second sound source separation system that differs in separation performance from the first sound source separation system in predetermined units of time, and outputting a sound source separation signal obtained by the combination.

REFERENCE SIGNS LIST

41 Sound source separation device
51-1 to 51-N, 51 Amplitude spectrum estimation unit
52 Combining unit
53 Separation signal generation unit
81 DNN unit
82 LSTM unit
111 Combination parameter determination unit

The invention claimed is:

1. A sound source separation device, comprising:
a central processing unit (CPU) configured to:
separate, by a first sound source separation system, a first sound source separation signal of a sound source from a mixed signal;
separate, by a second sound source separation system, a second sound source separation signal of the sound source from the mixed signal, wherein
a separation performance parameter of the second sound source separation system differs from a separation performance parameter of the first sound source separation system in specific units of time;
linearly combine the first sound source separation signal with the second sound source separation signal based on a combination parameter;
generate an output sound source separation signal based on the combination of the first sound source separation signal and the second sound source separation signal; and
output the generated output sound source separation signal.

2. The sound source separation device according to claim 1, wherein the CPU is further configured to determine the combination parameter based on:
a probability of the first sound source separation signal being a signal of the sound source, and
a probability of the second sound source separation signal being the signal of the sound source.

3. The sound source separation device according to claim 1, wherein each of the separation performance parameter of the first sound source separation system or the separation performance parameter of the second sound source separation system is based on at least one of a source to interference ratio (SIR), a sources to artifacts ratio (SAR), a signal to distortion ratio (SDR), or a source image to spatial distortion ratio (ISR).

4. The sound source separation device according to claim 1, wherein a magnitude relation, between the separation performance parameter of the first sound source separation system and the separation performance parameter of the second sound source separation system, changes with time.

5. The sound source separation device according to claim 1, wherein
the first sound source separation system is one of a feedforward neural network (FNN), a recurrent neural network (RNN), or a non-negative matrix factorization (NMF), and
the second sound source separation system is one of the FNN, the RNN, or the NMF.

6. A sound source separation method, comprising:
separating, by a first sound source separation system, a first sound source separation signal from a mixed signal;
separating, by a second sound source separation system, a second sound source separation signal from the mixed signal, wherein
a separation performance parameter of the second sound source separation system differs from a separation performance parameter of the first sound source separation system in specific units of times;
linearly combining the first sound source separation signal with the second sound source separation signal based on a combination parameter;
generating an output sound source separation signal based on the combination of the first sound source separation signal and the second sound source separation signal; and
outputting the generated output sound source separation signal.

7. A non-transitory computer-readable medium having stored thereon computer-executable instructions which, when executed by a processor, cause the processor to execute operations, the operations comprising:
separating a first sound source separation signal from a mixed signal by a first sound source separation system;
separating a second sound source separation signal from the mixed signal by a second sound source separation system, wherein
a separation performance parameter of the second sound source separation system differs from a separation performance parameter of the first sound source separation system in specific units of time;
linearly combining the first sound source separation signal with the second sound source separation signal based on a combination parameter;
generating an output sound source separation signal based on the combination of the first sound source separation signal and the second sound source separation signal; and
outputting the generated output sound source separation signal.

8. A sound source separation device, comprising:
a central processing unit (CPU) configured to:
separate, by a first sound source separation system, a first sound source separation signal of a sound source from a mixed signal;
separate, by a second sound source separation system, a second sound source separation signal of the sound source from the mixed signal, wherein
a separation performance parameter of the second sound source separation system differs from a separation performance parameter of the first sound source separation system in specific units of time;
determine a combination parameter based on:
a probability of the first sound source separation signal being a signal of the sound source, and
a probability of the second sound source separation signal being the signal of the sound source;
linearly combine the first sound source separation signal with the second sound source separation signal based on the combination parameter;
generate an output sound source separation signal based on the combination of the first sound source separation signal and the second sound source separation signal; and
output the generated output sound source separation signal.

* * * * *